United States Patent [19]
Frick

[11] Patent Number: 5,797,213
[45] Date of Patent: Aug. 25, 1998

[54] ADJUSTABLE LIVE WELL BRACKET

[76] Inventor: Robert J. Frick, 24 Ferncliff Dr., Bull Shoals, Ariz. 72619

[21] Appl. No.: 761,750

[22] Filed: Dec. 5, 1996

[51] Int. Cl.$^6$ .................................................. A01K 97/05
[52] U.S. Cl. ...................................... 43/54.1; 43/55
[58] Field of Search .............................. 43/54.1, 55, 56; 211/175; 248/346.07; 40/739, 741

[56] References Cited

U.S. PATENT DOCUMENTS

| | | | |
|---|---|---|---|
| 244,682 | 7/1881 | Snyder et al. | 211/175 |
| 268,558 | 12/1882 | Small | 43/55 |
| 292,123 | 1/1884 | Lindsay | 43/55 |
| 418,261 | 12/1889 | Wright | 40/739 |
| 541,864 | 7/1895 | Loomis. | |
| 933,388 | 9/1909 | Peticore. | |
| 1,110,892 | 9/1914 | Cather. | |
| 1,157,138 | 10/1915 | Wunder. | |
| 1,218,761 | 3/1917 | Grant | 40/741 |
| 1,494,136 | 3/1924 | Rybicky. | |
| 1,767,726 | 6/1930 | Woerz | 40/739 |
| 2,715,293 | 8/1955 | Martin | 43/55 |
| 3,716,938 | 2/1973 | Ammons | 43/55 |
| 3,985,511 | 10/1976 | Betts. | |
| 4,070,786 | 1/1978 | Dunham. | |
| 4,606,143 | 8/1986 | Murphy, Jr.. | |
| 4,642,934 | 2/1987 | Carlson et al. | 43/55 |
| 4,815,411 | 3/1989 | Burgess | 43/55 |
| 4,890,413 | 1/1990 | Nelson et al. | 43/56 |
| 4,896,778 | 1/1990 | Ferdinand et al. | 211/175 |
| 4,984,690 | 1/1991 | King et al. | 211/175 |

*Primary Examiner*—Jack W. Lavinder
*Assistant Examiner*—Darren Ark
*Attorney, Agent, or Firm*—Jacobson, Price, Holman & Stern, PLLC

[57] ABSTRACT

A container for fitting into a plurality of different sized live wells by the use of an easily adjustable live well bracket having a flexible netting secured to the bracket. The bracket is adjustable so as to be changeable to fit different sized live wells. Four L-shaped bracket portions are each slidably mounted with respect to two adjacent bracket portions. A thumb screw located within an elongated slot is manually rotatable to fix the position of interengaging arms of adjacent L-shaped bracket portions with respect to each other. By the sliding fit of the interengaging bracket portions, the bracket can be adjusted from a minimum size of 10¼ by 6¼ to 17¼ inches by 8¾ inches and anywhere in between these ranges of dimensions. Within this wide range of extension and retraction, the adjustable live well bracket can be adjusted to fit into most any size live well.

16 Claims, 3 Drawing Sheets

5,797,213

1

ADJUSTABLE LIVE WELL BRACKET

FIELD OF THE INVENTION

The present invention relates to a bracket which is insertable into most live well openings and is adjustable to fit different sized live wells. Netting hanging from the bracket facilitates the removal of fish from the live well upon lifting of the live well bracket.

BACKGROUND OF THE INVENTION

With the increased aging of America, an increasing proportion of the population is approaching or has reached retirement age. Retirees and others with increased available leisure time, are becoming more and more interested in water sport activities, particularly fishing.

Increasingly, leisure water crafts are being equipped with a live well for carrying live fish. For example, U.S. Pat. No. 4,815,411 to Burgess, herein incorporated in its entirety by reference, discloses a live well built into a boat for carrying live fish. A live well is used to keep caught fish in a live condition as long as possible to reduce spoilage and deterioration of the fish meat. In addition, the live well can keep fish alive for subsequent weighing in a fishing contest and return of the live fish to a body of water.

In the Burgess patent, a system has been devised to circulate water through the live well in the boat. Pumping into the well and simultaneously withdrawing water from the well produces a continuous circulation of water in the well to keep the fish alive.

A rigid container is insertable through an opening into the well through which water is circulated. If it is desired that the fish be transported to another location, a handle on a top of the container is lifted to remove the fish from the well with a supply of water maintained therein.

One of the disadvantages of the live well container of the Burgess patent is that the container is sized to fit within the specific well which is built into a particular boat. Accordingly, there is a need to provide a container for fitting in a live well that is not limited to use in a live well of a particular make or model of boat. For example, if different live wells are included in rental boats, there is a need to provide a container which can fit into many different sized live wells.

SUMMARY OF THE INVENTION

Accordingly, it is an object of the present invention to provide a container for fitting into a plurality of different sized live wells by the use of an easily adjustable live well bracket having a flexible netting secured to the bracket. The bracket assembly is adjustable in size to fit different sized live wells.

This object is accomplished by the use of four L-shaped bracket portions which are each slidably mounted with respect to two adjacent bracket portions. A thumb screw located within an elongated slot is manually rotatable to fix the position of interengaging arms of adjacent L-shaped bracket portions with respect to each other.

By the sliding fit of the interengaging bracket portions, the bracket can be adjusted from a minimum size of 10¼ inches by 6¼ inches to 17¼ inches by 8¾ inches and anywhere in between these ranges of dimensions. Within this wide range of extension and retraction of the bracket, the adjustable live well bracket assembly according to the present invention can be adjusted to fit into most any size live well.

At a corner of each L-shaped bracket portion, at the intersection of two arms, is a tab portion which serves to engage the upper lip of the live well, above the top surface of the live well. In addition, the exterior lateral walls of the L-shaped bracket portions which slidingly engage the interior side walls of the well are tapered at an angle of 5° to 10°, and preferably at an angle of 5°. This taper allows for a sliding engagement with the interior walls of the live well so as to properly seat the tab portions at the corners of the live well and secure the bracket in position around the top of the live well. Due to engagement with the side walls of the well, this tapered side wall of the bracket will also help prevent dislodgement by fish contacting the undersurface of the bracket assembly and possible upsetting of the bracket assembly from the top of the live well.

Extending around each of the bracket arms is fish netting which forms a flexible container within the well for use in removal of the fish from the well. The netting is wrapped around the arms of the bracket portions and secured onto itself. The net then extends downwardly to line the interior of the well. The natural movement of the fish will force the netting to its greatest extent as limited by the interior walls of the live well.

Thumb wheels extend through a superimposed arm of one bracket portion and into an engaged arm of an adjacent bracket portion. The thumb wheels include a threaded shaft for engaging a threaded collar. During expansion and retraction of the bracket portions with respect to each other, the thumb wheels may be removed and repositioned after adjustment of the brackets so as to pass through the netting at an appropriate location thereby avoiding snagging of the netting during expansion and retraction of the bracket portions.

When fish are to be removed from the live well, the live well cover is opened and the bracket is manually removed from the live well. The fish in the live well will become trapped in the netting secured to the bracket portions and be removed from the water in the live well with the bracket assembly.

It is therefore another object of the present invention to provide a bracket assembly which is adjustable in both length and width and which includes four corner tab portions for engaging the corners of a live well so as to suspend the bracket and its attached net from the upper surface of the live well.

It is yet another object of the present invention to provide an adjustable live well bracket, formed of four L-shaped bracket portions, which is adjustable in both length and width and having an exterior lateral surface of the brackets inclined at an angle of 5° to 10°, and preferably 5°, so as to slidingly fit with the interior surfaces of the upper portion of a live well.

It is still yet another object of the present invention to provide an adjustable live well bracket having interengaging portions so as to adjust the length and the width of the bracket by removable thumb screws which can be repositioned after adjustment of the bracket so as to pass through netting surrounding cooperating bracket portions and to fix the position of the bracket portions with respect to each other.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
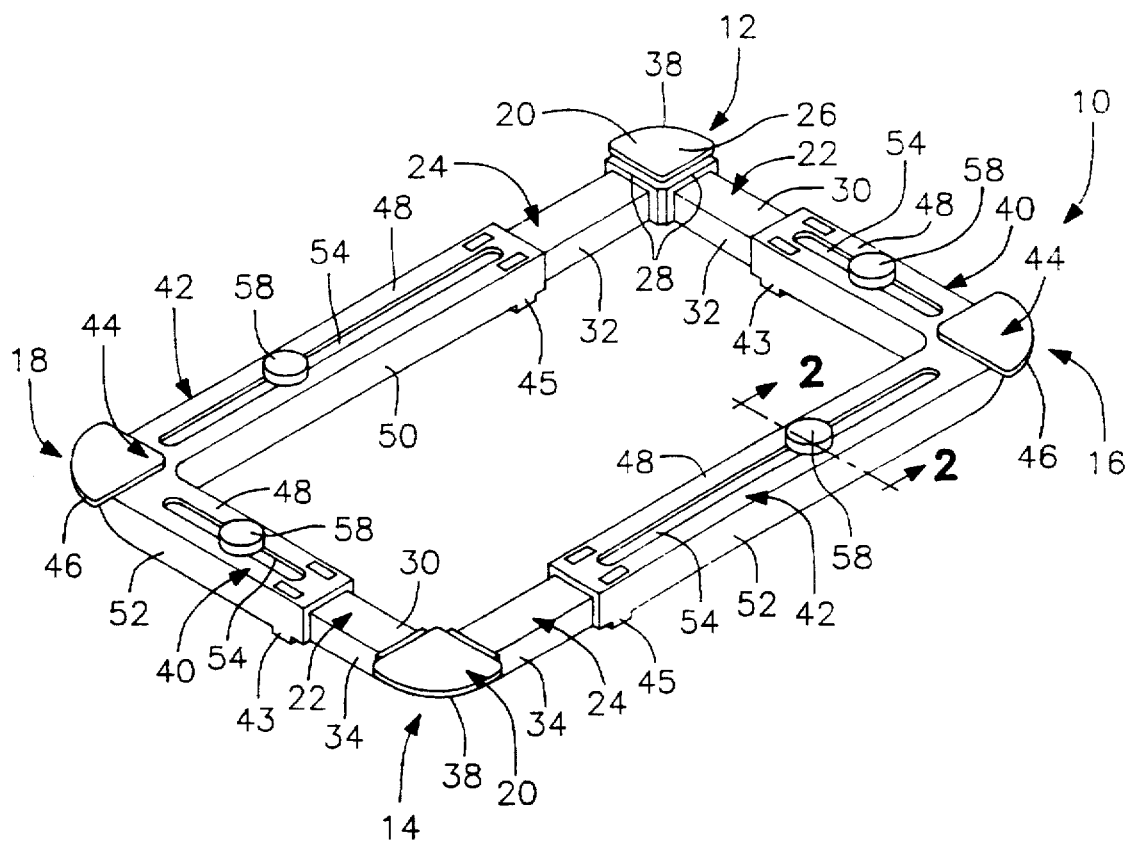
FIG. 1 is a perspective view of four L-shaped bracket portions which are interengaged to form the adjustable live well bracket of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
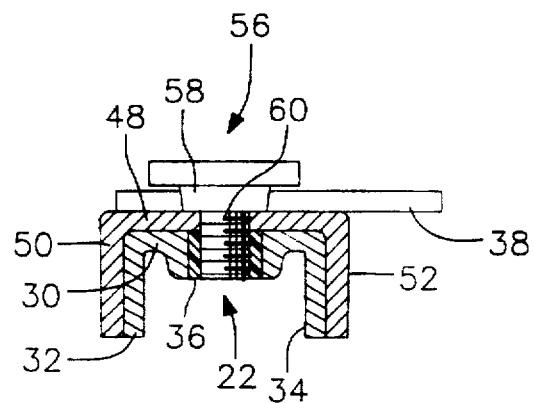
FIG. 2 is a cross-sectional view taken along line 2—2 of FIG. 1.
Figure 3:
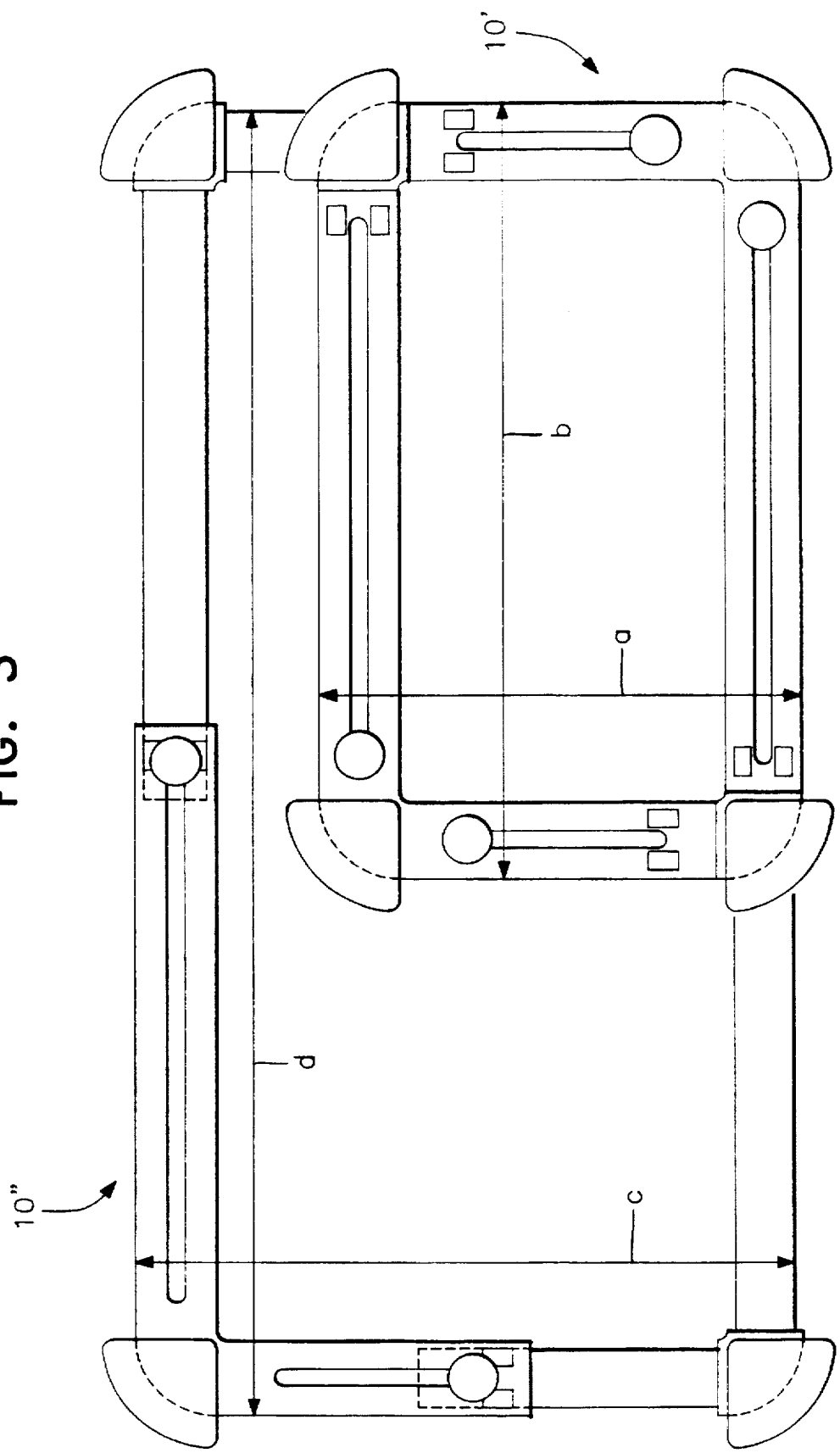
FIG. 3 illustrates the fully closed position of the bracket and the expansion of the bracket to its fully opened position.

With reference to the drawings, in general, and to FIGS. 1 to 3, in particular, an adjustable live well bracket embodying the teachings of the subject invention is generally designated as 10. With reference to its orientation in FIG. 1, the adjustable live well bracket includes four L-shaped bracket portions 12 and 14 and 16 and 18.

Each of the bracket portions 12 and 14 include a corner tab 20 from which extend, at an angle of 90° to each other, two arms 22, 24. Arms 22 and 24 are U-shaped and are recessed from an upper surface 26 of the corner tabs 20 by a stepped portion 28. The stepped portion 28 is U-shaped and extends along the top and the sides of the arms 22, 24.

Each of the arms 22, 24 are U-shaped having cross-piece 30, interconnecting two perpendicular extending sides 32, 34. As shown in FIG. 2, at a free end of each arm, cross-piece 30 includes a thickened portion having an internally threaded collar 36.

Tab portion 38 of the corner tab 20 is a curved planer portion projecting approximately ⅛ of an inch beyond the periphery of the lateral edges of the arms of the bracket portions 16, 18.

Bracket portions 12 and 14 are diagonally across from each other in the bracket 10. Interengaging with and also positioned diagonally across from each other are bracket portions 16 and 18. Bracket portions 16 and 18 include arms 40, 42 which are of an approximate length equal to arms 22 through 24. Arms 40 and 42 extend perpendicular to each other and are connected at corner tabs 44 having tab portions 46 extending beyond the periphery of the arms 40, 42.

The arms 40, 42 are U-shaped having top surface 48 interconnecting exterior side surface 52 and interior side surface 50. Projections 43, 45 extend inwardly from opposite sides of the free end of arms 40, 42 to engage and retain arms 22, 24 of bracket portions 12, 14 in place.

The upper surfaces 48 of the arms 40, 42 include an elongated slot 54. Mounted within the elongated slot is a thumb screw 56 having head 58 connected to a threaded shaft 60 for cooperation with the collar 36 of the arms 22, 24 of the bracket portions 12, 14.

It is important to note that the exterior side walls 52 of arms 40 and 42, taper inwardly from upper surface 48 towards the lowermost edge of the exterior side wall 52. The angle of taper is approximately 5° to 10°, and preferably 5°. The slight inward taper assures a sliding, and ultimately friction fit, of the bracket 10 upon insertion of the bracket into a live well. The bracket is slid into the live well until the interior side walls of the live well encounter the tab portions 38, 46 and frictionally engage the side walls 52 for supporting the bracket 10 on the top of a live well.

With reference to FIG. 3, the bracket 10' is shown in its fully retracted condition having a width "a" of 6¼ inches and a length "b" of a 10¼ inches as measured between exterior side walls 52 of arms 42 and exterior side walls 52 of arms 40, respectively.

In its fully extended position, bracket 10" has a width "c" of 8¾ inches and a length "d" of 17¼ inches as measured from exterior side walls 52 between arms 42 and between exterior side walls 52 of arms 40, respectively. The varied size of the bracket may range anywhere between the size of frame bracket 10' and frame bracket 10".

Adjustment of the bracket size is obtained by unscrewing thumb screw 56 (as shown in FIG. 2) from collar 36. The bracket portions are then slid with respect to each other. The shaft 60 of the thumb screw 56 is reinserted into the collar 36. The head 58 is rotated until the head 58 seats in a slot in the upper surface 48 of arms 42 and 44 to fix the position of the arms 40, 42 with respect to arms 22, 24 of bracket portions 12 and 14.

Figure 4:
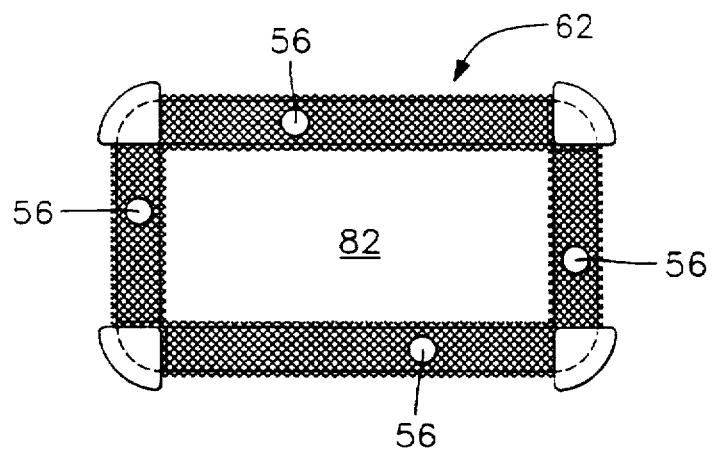
FIG. 4 is a plan view of the adjustable live well bracket of the present invention, with netting surrounding the arms of each bracket portion.

As shown in FIG. 4, a net 62 surrounds each of the arm portions 22, 24 and arm portions 40, 22. The net 62 and bracket 10 form bracket assembly 100. For extension or retraction of the size of the bracket assembly, the thumb screws 56 are removed, the size of the bracket assembly adjusted by sliding of arms of adjacent bracket portions with respect to each other, the thumb screws reinserted through net openings and the slots 54, and into the collars 36. Accordingly, the thumb screws do not hinder the expansion and retraction of the nets which surround and slide along the arms 42, 24 and 40, 22.

In use, a live well 64 is located extending below a surface 66 of a boat (not shown). A container 68 of the live well typically holds water and preferably fish. An upper surface 70 of the live well includes an opening defined by flanges 72. A cover 74 spans an opening 76 of the live well and is pivotally mounted by a hinge 78 to surface portion 70. The opposite end 80 of the cover 74 is liftable so as to gain access to the interior of the live well 64.

Figure 5:
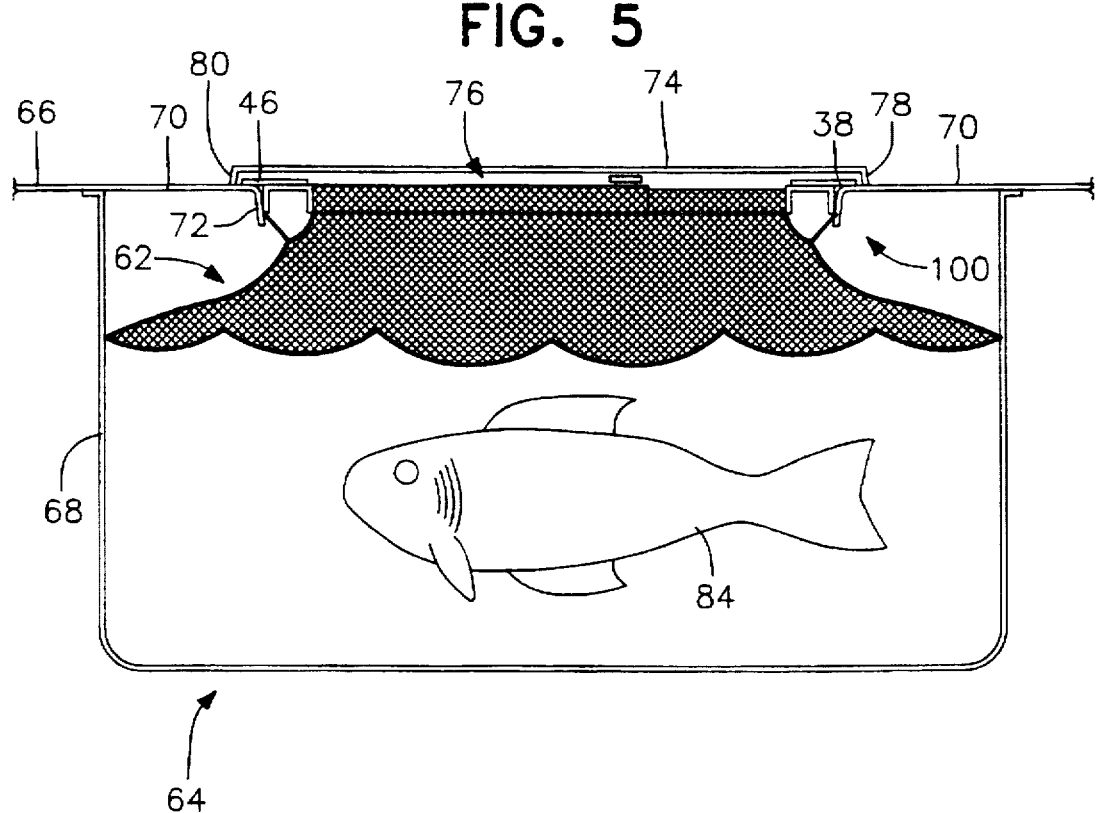
FIG. 5 is a partial sectional view of the live well bracket of the present invention mounted in an opening of a live well so as to extend the netting mounted on the bracket to surround and retain a fish.

As shown in FIG. 5, tab portions 46 and 38 rest on top of surface portions 70 so as to hold the position of the bracket assembly in the opening 76 of the live well 64. The net 62 hangs downwardly from the bracket assembly and into the water in the live well 64.

When a fish is caught, the fish is placed into the opening 82 defined by the periphery of the bracket assembly. The net 62 hanging down from the bracket assembly will define the limits of travel of the fish 84 as limited by the side walls of the live well 64.

When it is desired to remove the fish 84 from the live well 64, the cover 74 is opened by lifting end 80. The bracket assembly 100 is then lifted by grabbing the bracket 10. The net 62 will contain the fish in the live well such that the fish are removed with the bracket as contained in the net 62.

Having described the invention, many modifications thereto will become apparent to those skilled in the art to which it pertains without deviation from the spirit of the invention as defined by the scope of the appended claims.

I claim:

1. An adjustable live well bracket assembly for use together with a live well having a rectangular shape with side walls including an upper edge, said adjustable live well bracket comprising:

four bracket portions forming a rectangular shaped frame for fitting in and on a live well, said four bracket portions each slidingly engaging an arm of two adjacent bracket portions for adjusting a size of said frame to the size of the live well, a tab portion located at an upper surface and at each corner of said frame, said tab portion projecting beyond and above an exterior lateral edge of said bracket portion for engaging the upper edge of the live well at corners of the live well while the exterior lateral edges of the bracket portions engage an interior surface of the side walls of the live well to secure the bracket portions in position around the circumference of the upper edge of the side walls of the live well, four thumb screws projecting above an upper surface of the bracket portions and extending between one arm of one bracket portion and another arm of another bracket portion for securing said one arm and said another arm together in a fixed position and said thumb screws being accessible from the upper surfaces of the bracket portions for loosening and tightening of the thumb screws so as to be able to form varied sized frames defined by said bracket portions, and a net suspended from said frame and secured around said arms of said bracket portions.

2. An adjustable live well bracket assembly as claimed in claim 1, wherein said thumb screws extend through an elongated slot defined in said one arm and threadingly engage a collar in said another arm.

3. An adjustable live well bracket assembly as claimed in claim 1, wherein said arms are U-shaped.

4. An adjustable live well bracket assembly as claimed in claim 1, wherein said tab portion is part of a triangular shaped protrusion mounted at an intersection of two arms of each bracket portion.

5. An adjustable live well bracket assembly as claimed in claim 1, wherein an exterior lateral wall of said arms of said bracket portions is tapered at an angle of 5° to 10°.

6. An adjustable live well bracket assembly as claimed in claim 5, wherein said angle is 5°.

7. An adjustable live well bracket assembly as claimed in claim 1, wherein said net is slidable on said arms so as to expand and retract upon expansion and retraction of the frame to fit different sized live wells.

8. An adjustable live well bracket assembly for fitting different sized live wells having a rectangular shape with side walls including an upper edge, said adjustable live well bracket assembly comprising:

two bracket portions each having two arms extending perpendicular to each other and having a threaded collar at a free end of each arm, another two bracket portions each having two arms extending perpendicular to each other and having an elongated slot extending longitudinally in an upper surface of said two arms, said two arms of said two bracket portions being slidably mounted in said two arms of said another two bracket portions, a thumb screw projecting above the upper surface of the bracket portions and extending through each of said slots of said two arms of said another two bracket portions and into said threaded collar of said two arms of said two bracket portions for fixing a position of said two bracket portions with respect to said another two bracket portions and said thumb screws being accessible from the upper surface of the bracket portions for loosening and tightening thereof so as to be able to form varied sized frames defined by said bracket portions to fit within a live well with exterior lateral walls of the bracket portions engaging an interior surface of the side walls of the live well to secure the bracket portions in position around the circumference of the upper edge of the side walls of the live well, and a net suspended from and slidably mounted on said arms of said two bracket portions and said two arms of said another two bracket portions.

9. An adjustable live well bracket assembly as claimed in claim 8, wherein said thumb screws include a head shaped to fit in said slots and a threaded shaft for threadingly engaging said threaded collar.

10. An adjustable live well bracket assembly as claimed in claim 8, wherein said arms of said two bracket portions and said arms of said another two bracket portions are U-shaped.

11. An adjustable live well bracket assembly as claimed in claim 10, wherein said arms of said another two bracket portions include inwardly extending projections at their free ends for engaging and retaining said two arms of said two bracket portions.

12. An adjustable live well bracket assembly as claimed in claim 8, wherein at an intersection of said two arms of said two bracket portions and at an intersection of said two arms of another two bracket portions a tab extends beyond and above an exterior periphery of said two arms of said two bracket portions and said two arms of said another two bracket portions for engaging an upper edge of side walls of a live well to support the bracket assembly above the live well.

13. In combination, a live well and an adjustable live well bracket assembly for use together with the live well having a rectangular shape with side walls including an upper edge, said adjustable life well bracket including four bracket portions forming a rectangular shaped frame fitting in and on the live well, said four bracket portions each slidingly engaging an arm of two adjacent bracket portions for adjusting a size of said frame to the size of the live well, a tab portion located at an upper surface and at each corner of said frame, said tab portion projecting beyond and above an exterior lateral edge of said bracket portion and engaging the upper edge of the live well at corners of the live well while the exterior lateral edges of the bracket portions engage an interior surface of the side walls of the live well to secure the bracket portions in position around the circumference of the upper edge of the side walls of the live well in a friction fit to prevent dislodgment by fish contacting an undersurface of the bracket assembly, thumb screws projecting above an upper surface of the bracket portions and extending between one arm of one bracket portion and another arm of another bracket portion for securing said one arm and said another arm together in a fixed position and said thumb screws being accessible from the upper surface of the bracket portions for loosening and tightening of the thumb screws so as to be able to form varied sized frames defined by said bracket portions, and a net suspended from said frame and secured around said arms of said bracket portions.

14. The combination as claimed in claim 13, wherein said tab portion is part of a triangular shaped protrusion mounted at an intersection of two arms of each bracket portion.

15. The combination as claimed in claim 13, wherein the exterior lateral wall of said arms of said bracket portions is tapered at an angle of 5° to 10°.

16. The combination as claimed in claim 15, wherein said angle is 5°.

* * * * *